United States Patent [19]

Pettus

[11] Patent Number: 5,406,249

[45] Date of Patent: Apr. 11, 1995

[54] METHOD AND STRUCTURE FOR COUPLING POWER-LINE CARRIER CURRENT SIGNALS USING COMMON-MODE COUPLING

[75] Inventor: Michael G. Pettus, Aptos, Calif.

[73] Assignee: Metricom, Inc., Los Gatos, Calif.

[21] Appl. No.: 28,487

[22] Filed: Mar. 9, 1993

[51] Int. Cl.6 .......................................... H04M 11/04
[52] U.S. Cl. ........................... 340/310.06; 340/310.07; 375/259
[58] Field of Search ........ 340/310 R, 310 A, 310 CP; 370/36, 37

[56] References Cited

U.S. PATENT DOCUMENTS

| | | | |
|---|---|---|---|
| 3,075,129 | 1/1963 | Dallemagne | 317/148.5 |
| 3,846,638 | 11/1974 | Wetherell | 307/3 |
| 3,942,170 | 3/1976 | Whyte | 340/310 |
| 4,008,467 | 2/1977 | Pattantyus-Abraham et al. | 340/310 |
| 4,066,912 | 1/1978 | Wetherell | 307/3 |
| 4,357,598 | 11/1982 | Melvin, Jr. | 340/310 A |
| 4,427,968 | 1/1984 | York | 340/310 R |
| 4,473,817 | 9/1984 | Perkins | 340/310 R |
| 4,481,501 | 11/1984 | Perkins | 340/310 R |
| 4,556,864 | 12/1985 | Roy | 340/310 |
| 4,714,912 | 12/1987 | Roberts et al. | 340/310 A |
| 4,745,391 | 5/1988 | Gajjar | 340/310 A |
| 4,766,414 | 8/1988 | Shuey | 340/310 A |
| 4,772,870 | 9/1988 | Reyes | 340/310 R |
| 4,806,929 | 2/1989 | Nishijima et al. | 340/310 A |
| 4,890,089 | 12/1989 | Shuey | 340/310 A |
| 4,903,006 | 2/1990 | Boomgaard | 340/310 A |
| 4,935,837 | 6/1990 | Sun | 361/64 |
| 4,962,496 | 10/1990 | Vercellotti et al. | 370/11 |
| 5,066,939 | 11/1991 | Mansfield, Jr. | 340/310 R |
| 5,210,519 | 5/1993 | Moore | 340/310 A |

OTHER PUBLICATIONS

ABB Power T&D Company Inc., *EMETCON Automated Distribution System* Brochure (Jan. 1990).
Westinghouse ABB Power T&D Company, *EMETCON Automated Distribution System Communication Guide* (Sep. 1989).
Armando Garcia, Florida Power & Light, Notes from National Symposium on Automatic Meter Reading (Sep. 1989).

*Primary Examiner*—John K. Peng
*Assistant Examiner*—Nina Tung
*Attorney, Agent, or Firm*—Townsend and Townsend Khourie and Crew

[57] ABSTRACT

An apparatus and a method for communicating data among transceivers in an electrical utility distribution system where a signal path between the transceivers includes multiple power distribution transformers is described. A first transceiver, common-mode coupled to a secondary of a first power distribution transformer transmits a carrier signal modulated by a data stream to the secondary. The modulated signal is transferred to the primary of the first power distribution transformer which is coupled to the primary of a second power distribution transformer. A second transceiver, common-mode coupled to a secondary of the second power distribution transformer, receives the modulated signal from the secondary. Both transceivers are protected from the high power delivered at the line frequency by filtering capacitors which attenuate signals at the line frequency and pass signals at the carrier signal frequency.

8 Claims, 5 Drawing Sheets

METHOD AND STRUCTURE FOR COUPLING POWER-LINE CARRIER CURRENT SIGNALS USING COMMON-MODE COUPLING

BACKGROUND OF THE INVENTION

The present invention relates to the field of power-line carrier communications, more specifically to an apparatus and method for communicating among transceivers separated by power distribution transformers.

Power-line carrier (PLC) systems provide a means for electronically communicating between two points using the existing wiring of a power distribution system. PLC systems are common for communicating within a building, whether the building is a house, apartment building, business, or industrial building. Each point on the power lines within the building is directly connected to each other point in the building, except in the rare case where a distribution or isolation transformer is installed inside a building. More typically, however, power is supplied from a distribution transformer installed on a power pole to the building.

In distributing power from a utility generating station to a utility subscriber's building, the power passes through successively smaller branching networks, until it is finally split off to several distribution transformers, each of which have secondary windings directly connected to one or more subscribers. Because each of the subscribers connected to a single distribution transformer have power lines electrically connected to the secondary side of the same distribution transformer, PLC communication is easily possible between subscriber sites which share a common distribution transformer, but communication beyond the typically small number of subscribers on one distribution transformer requires passing a PLC signal through or around one or more distribution transformers.

One application of a PLC system is for remote meter reading where meters at each subscriber site record usage and transmit a signal indicating the amounts used to a local receiver, which collects reading from several transmitters using PLC communications, and then relays the data to a central utility computer via radio or telephone lines. The transmitters can also be configured as receivers to receive data such as load shedding and power blocking commands from a local transceiver. With one local transceiver or receiver connected at the secondary side of each distribution transformer, no PLC communications through a distribution transformer is necessary. However, such a system is uneconomical, and in a practical system, a local transceiver must be able to collect data from and distribute data to subscribers on more than one distribution transformer, thus requiring an ability to communicate through one or more distribution transformers.

Since the distribution transformers are optimized to pass power at the power line frequency, typically 60 Hz, a PLC carrier frequency at a higher frequency is greatly attenuated by the transformer. A higher frequency PLC carrier is necessary to achieve adequate data rates and to allow the PLC signal to be separated from the power being delivered to the subscriber's power lines. Loss of signal through distribution transformers is especially troublesome when communicating between two subscribers coupled to separate distribution transformers, since signals must pass through both distribution transformers and therefore the loss is squared.

One method of transmitting higher frequency PLC carriers through a distribution transformer is to bypass the transformer. For example, U.S. Pat. No. 4,473,817, issued to Perkins, illustrates a communication system where a signal is passed from the primary side of a distribution transformer to the secondary side using a separate communications transformer with a capacitor in a circuit optimized for the carrier frequency. However, such a system requires additional hardware and the second transformer absorbs some of the power destined for subscribers.

From the above, it is seen that an improved means for communicating through a distribution transformer is needed.

SUMMARY OF THE INVENTION

The invention provides an improved method and apparatus for communicating among transceivers in an electrical utility distribution system where a signal path between the transceivers includes one or more distribution transformers.

In accordance with the present invention, a first transceiver is provided at one subscriber site which is to communicate with a transceiver provided at a second subscriber site, where the two sites are coupled to separate distribution transformers. The first transceiver at the first site transmits a modulated carrier signal referenced to earth ground. The signal passes through the secondary distribution lines which run between the first site and a first distribution transformer.

The signal then passes through the first transformer to a second distribution transformer which is coupled to the first transformer by a primary power line in common with both transformers, and then passes through secondary distribution lines running from the second distribution transformer to a transceiver at the second site. Coupling is provided according to the invention by capacitors coupled to the secondary distribution lines, where the same polarity signal is applied to each coupled line of the secondary distribution lines, thereby effecting an alternating current (AC) common-mode coupled connection to the secondary distribution lines. Because the signal is common-mode at the transformers, as opposed to differential mode, the transmission from one site to another suffers negligible loss, the loss being due to parasitic resistances and reactances, since according to the invention each distribution transformer operates as a capacitor to convey the AC common-mode coupled signals through the transformer. Furthermore, whereas differential signal transfer through a transformer requires tight magnetic coupling between the primary and secondary windings, common-mode coupling, which is, in this case, capacitive as opposed to magnetic, is less affected by the degree of magnetic coupling between the windings.

With single phase power lines, two coupling capacitors at each site are used, with one lead of each capacitor connected to a secondary winding of a distribution transformer and the other lead coupled to a transceiver. The center tap of the secondary winding is connected to earth ground. The coupling capacitors are selected such that the series combination of a first set of parallel coupling capacitors, the primary-to-secondary capacitance of a first distribution transformer, the primary-to-secondary capacitance of a second distribution transformer, and a second set of parallel coupling capacitors form a low impedance capacitive coupling between two transceivers at the carrier frequency, and a high impedance path at the power line frequency. In one embodiment, the carrier signal frequency is 230 kHz.

With three-phase power lines, a transceiver is coupled through three coupling capacitors to each of three end taps of the respective secondaries of distribution transformers.

In other various embodiments, two-way communication is effected between secondaries of different power distribution transformers, or communication is effected between one secondary of one transformer and secondaries of a plurality of transformers, thus forming various communication network architectures.

In yet another embodiment, some transceivers are designated as being store-and-forward nodes, where such transceivers store packets addressed to other transceivers and then retransmit such packets, thereby allowing a packet to travel further than a single transceiver-transceiver hop would allow.

A further understanding of the nature and advantages of the inventions herein may be realized by reference to the remaining portions of the specification and the attached drawings.

DESCRIPTION OF THE PREFERRED EMBODIMENTS

Figure 1:
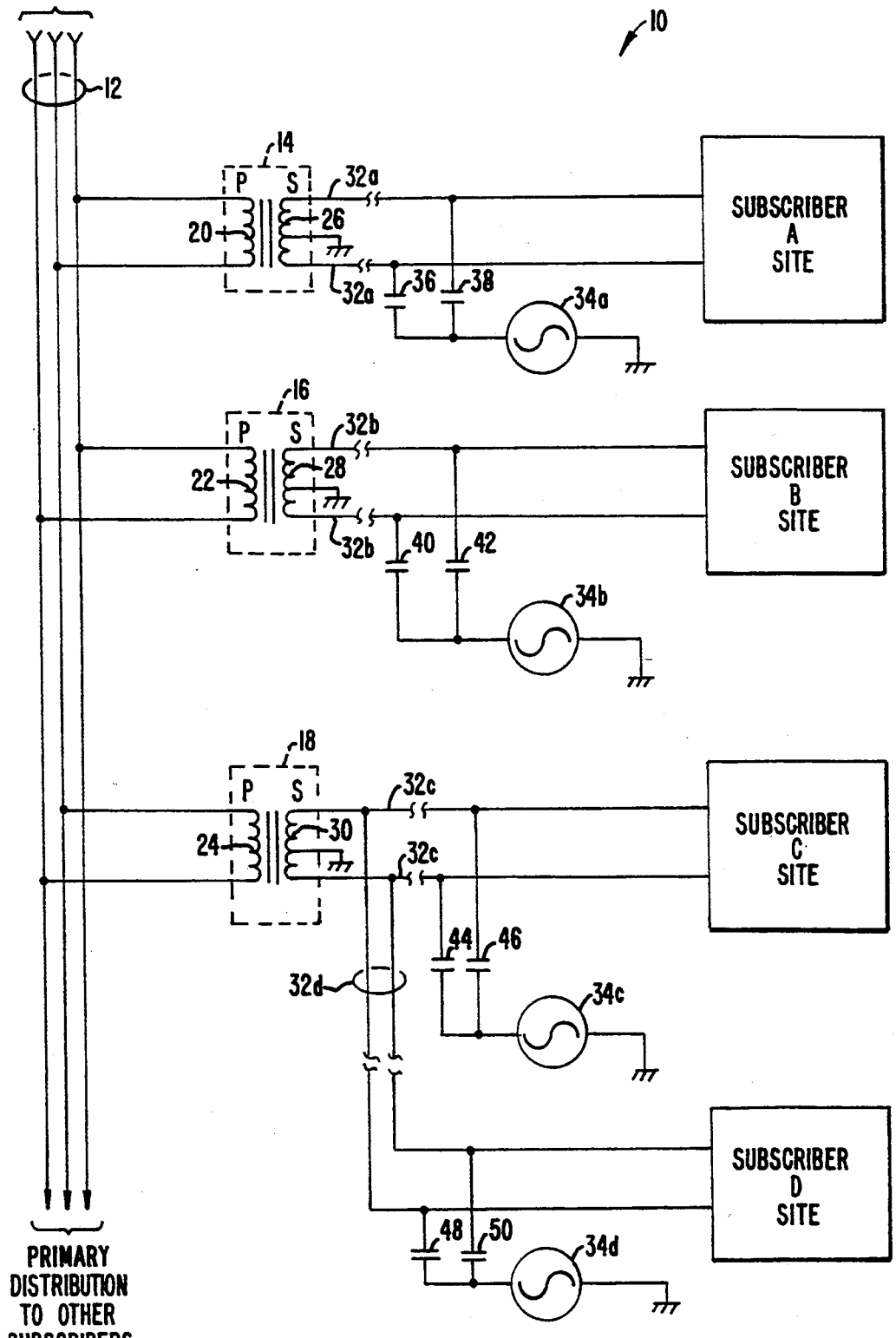
FIG. 1 is a schematic diagram of an embodiment of a power line communication system according to the present invention, where subscribers are provided with single phase power.

FIG. 1 shows a power line carrier communications system 10 where electrical power is distributed from an electrical utility generating plant (not shown), along primary power lines 12, to utility subscribers A, B, C, and D. Three distribution transformers 14, 16, 18 are shown. Each distribution transformer has a primary winding, such as winding 20, 22, or 24, coupled to primary power lines 12, and each primary winding is magnetically coupled, and provides power, to a secondary winding, such as winding 26, 28, or 30. Subscriber power lines at subscriber sites are coupled to the secondary winding of one of the distribution transformers. A single distribution transformer may supply more than one subscriber, such as distribution transformer 18, which supplies power to subscriber C and subscriber D.

Electrical power is conveyed to exemplary subscriber site A, through secondary power lines 32a. Power is also conveyed to other subscribers through other secondary power lines 32b-d. In a typical power distribution system, one distribution transformer provides power for more than one or two subscribers. However for clarity, only a sample of subscribers is illustrated in the figures.

At subscriber site A, transceiver 34a is coupled to secondary power lines 32a through coupling capacitors 36 and 38. Other transceivers 34b-d are similarly coupled to respective secondary power lines at subscriber sites through similar coupling capacitors. The coupling capacitors are selected to block the power at the power line frequency of 60 Hz from reaching the transceivers, but not to block a communication signal at a higher carrier frequency. In one embodiment of the present invention, data is modulated onto a 230 kHz carrier signal, and coupling capacitors 36, 38 each have a capacitance sufficient to convey the carrier with an impedance substantially less than power frequency signals, typically in the small microfarad range. In other embodiments, the carrier frequency ranges from 10 kHz to 400 kHz. The coupling capacitors may be selected to establish a high-pass filter circuit with the ambient inductance of the system.

Figure 2:
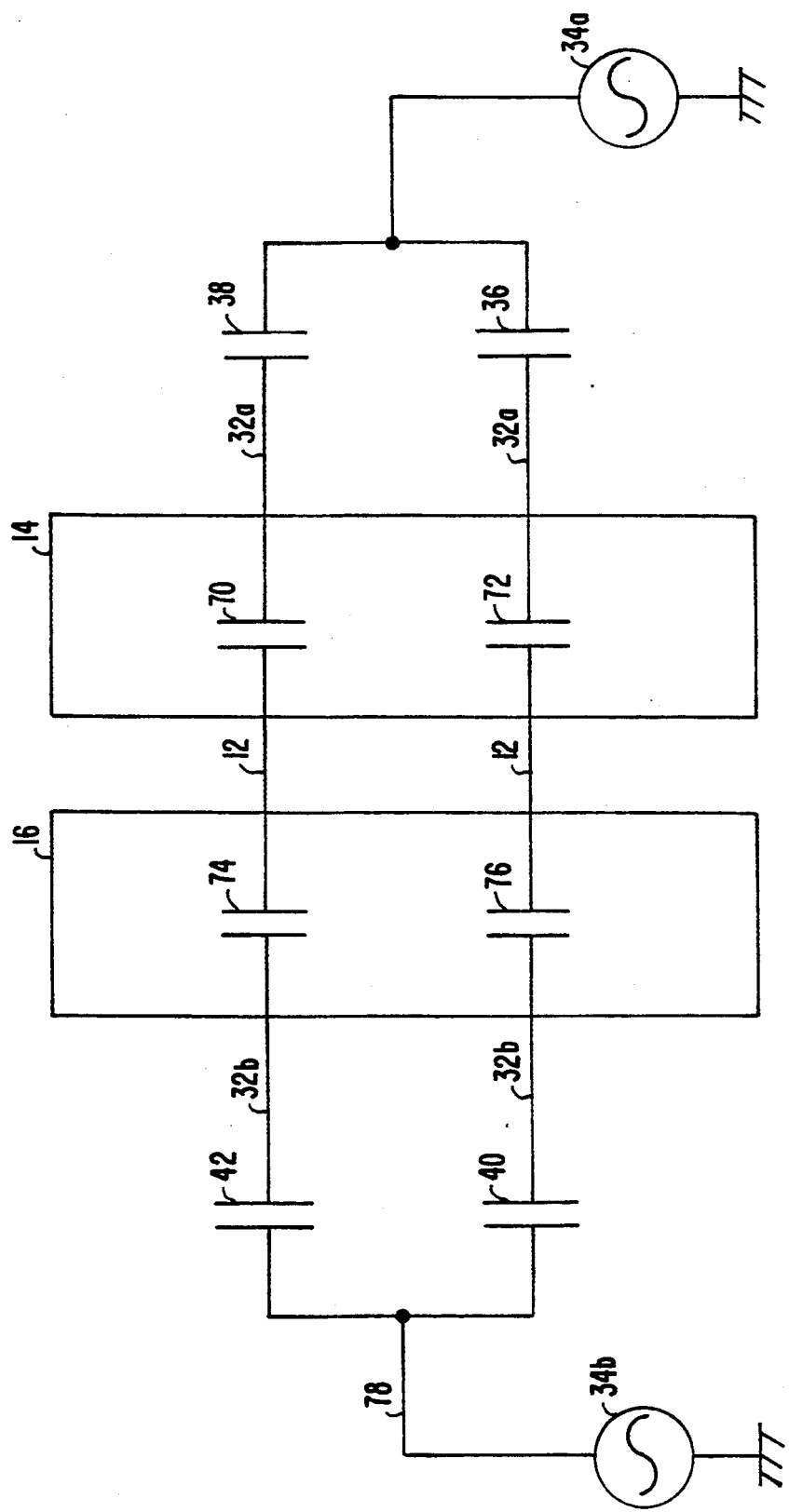
FIG. 2 is a schematic of a model of a communication path between two transceivers.

Because of the particular arrangement of circuit elements, a communication path at the carrier frequency between two subscribers, such as A and B, is modelled by the circuit shown in FIG. 2. Significantly, because signals are placed on the transformer secondary leads as common-mode signals, and because of the impedance of the distribution transformer's primary-to-secondary capacitance at the carrier frequency, the path from subscriber A to subscriber B is a low attenuation path compared with differential coupling.

Referring to FIG. 2, a PLC signal relative to earth ground is transmitted from transceiver 34a through coupling capacitors 36, 38, secondary-to-primary winding capacitances 70, 72 of distribution transformer 14, primary distribution lines 12, primary-to-secondary winding capacitances 74, 76 of distribution transformer 16, and coupling capacitors 40, 42, to transceiver 34b, where the signal provided to transceiver 34b on line 78 is referenced to earth ground. As should be apparent from FIG. 2, communication is possible in the other direction, from transceiver 34b to transceiver 34a, as well as communication in both directions simultaneously. It should be further apparent that communication is also possible using only one of the two parallel paths shown in FIG. 2. However an embodiment using parallel paths is the preferred embodiment.

Figure 3:
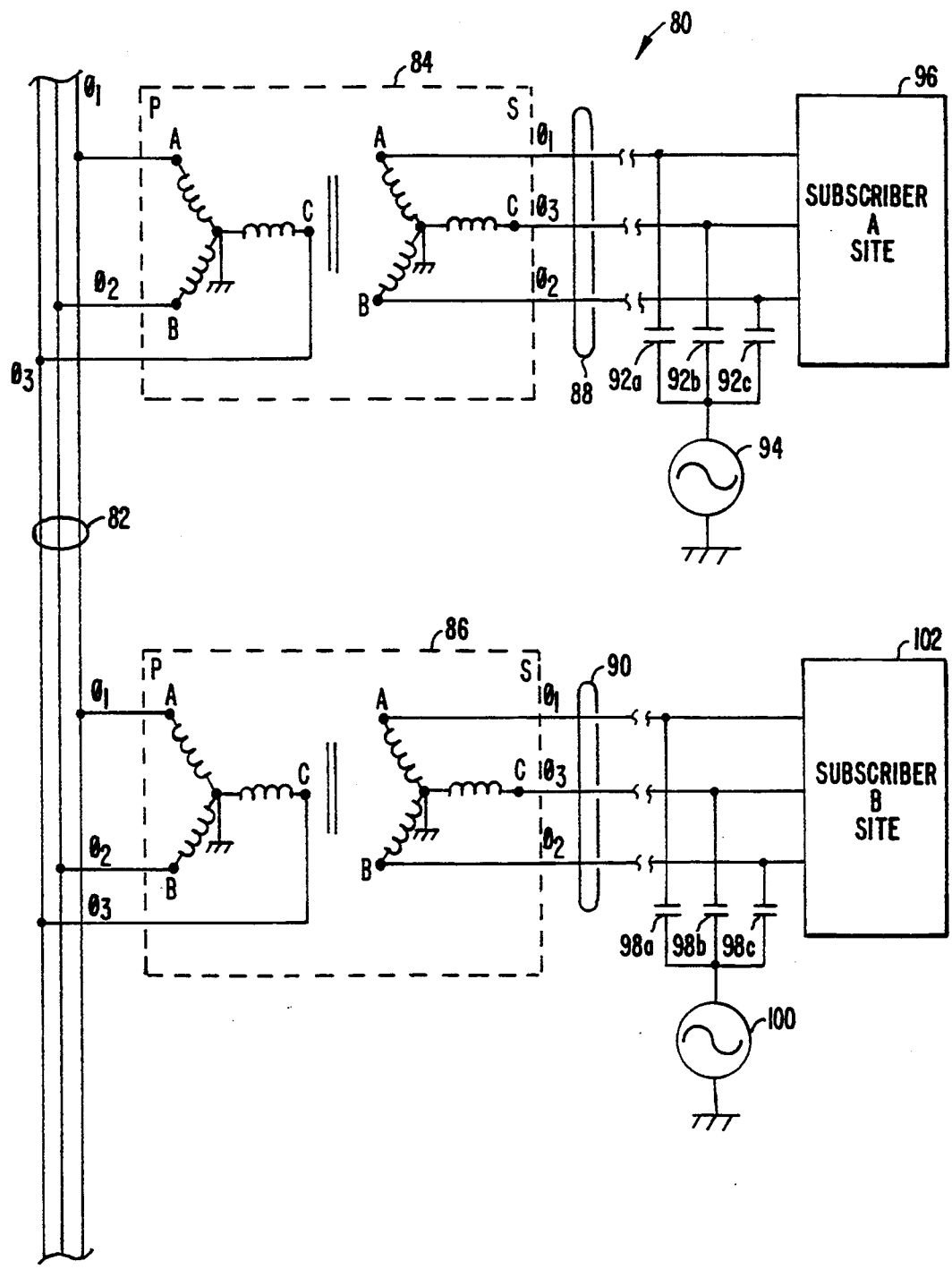
FIG. 3 is a schematic diagram of an embodiment of a power line communication system according to the present invention, where subscribers are provided with three phase power through wye-configured distribution transformers.

FIG. 3 is a schematic diagram of a power line carrier communication system 80, which is similar to that shown in FIG. 1 except the secondary power lines carry three-phase power on four lines, and the distribution transformers are configured on in a wye configuration. In FIG. 3, only two subscriber sites are shown. However, in a typical power distribution system, several sites are powered from one transformer, and more than two transformers receive power from a primary distribution line.

Three-phase electrical power is provided to subscriber A from primary distribution line 82 through the primary windings of distribution transformer 84, the secondary windings of distribution transformer 84, and secondary distribution lines 88. Electrical power is provided to subscriber B through distribution transformer 86 and secondary distribution lines 90.

Transceiver 94 transmits a PLC signal to transceiver 100. Transceiver 100 also may transmit a signal to transceiver 94. However, only transmission in one direction will be described here. A signal output from transceiver 94 is applied equally to three coupling capacitors 92a–c. These coupling capacitors couple the high-frequency signal (10 kHz–400 kHz) onto each line of secondary distribution lines 88 while preventing the high power at the power line frequency (60 Hz or lower) from reaching transceiver 94.

Because the PLC signal is a common-mode signal relative to earth ground, and the center node of the secondary windings of distribution transformer 84 is coupled to earth ground, the PLC signal is imposed on the three secondary windings. Due to capacitive coupling, and some magnetic coupling in this case, the signal is transmitted through to the primary side of distribution transformer 84. In a similar manner, the signal is transmitted through primary distribution lines 82, distribution transformer 86 and a second set of coupling capacitors 98a–c, to reach transceiver 100.

Figure 4:
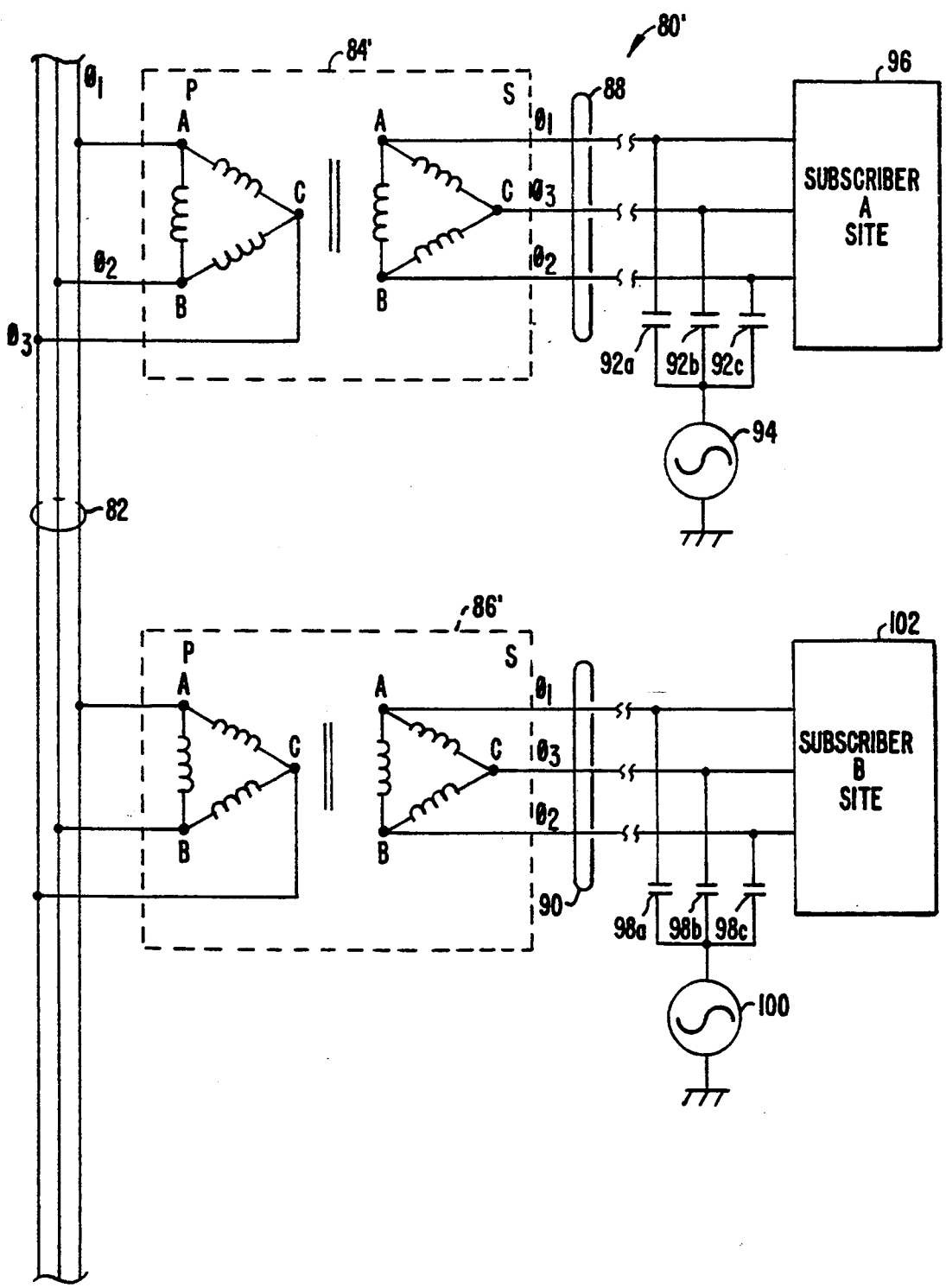
FIG. 4 is a schematic diagram of an embodiment of a power line communication system according to the present invention, where subscribers are provided with three phase power through closed-delta configured distribution transformers.

FIG. 4 is a schematic diagram of a power line carrier communication system 80'. It is similar to communication system 80, except that the distribution transformers are configured as a closed delta. Enumeration of elements is as in FIG. 3.

Figure 5:
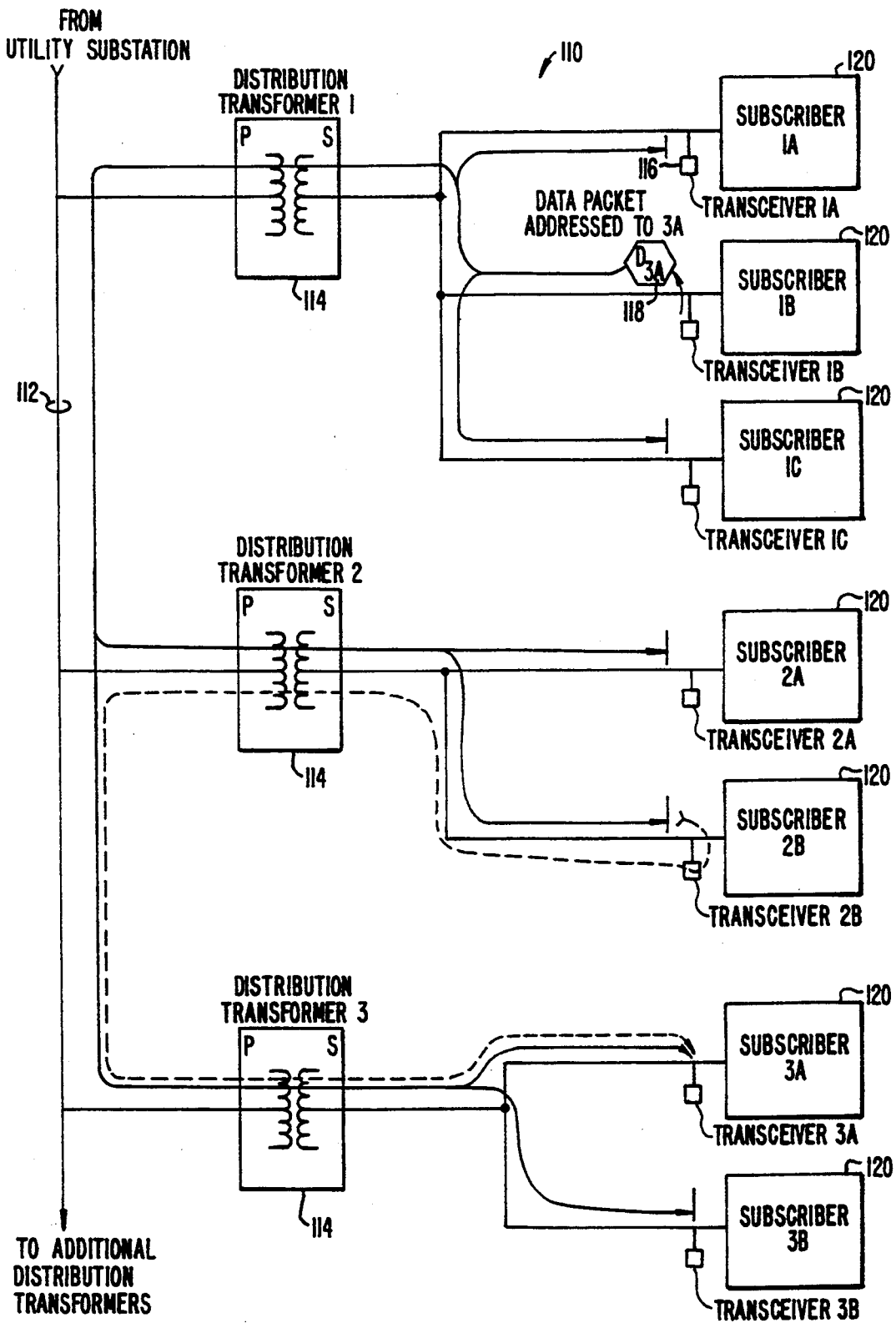
FIG. 5 is a block diagram of a power distribution system wherein various subscribers coupled to a common primary line and transceivers at each subscriber site are shown.

FIG. 5 is a block diagram of a communication system 110 in accordance with the present invention, illustrating the transmission of data packets from one site to another. Data originating at a subscriber site 120 is packaged into a packet, such as packet 118, where packet 118 includes information indicating a destination address. Data is transmitted through the power system as shown in FIGS. 1, 3, or 4, and is transmitted as digital modulation of a carrier signal, as is well known in the art.

The packet is transmitted to more than one transceiver by virtue of the fact that many transceivers are coupled to power distribution lines which can carry signals from the originating transceiver. To avoid unnecessary duplication of packets, each transceiver contains hardware or software for reading the address data in each received packet, and rejects those packets which do not have an address matching the assigned address of the transceiver. In the example shown in FIG. 5, packet 118 is transmitted to all transceivers, but only the addressee, namely, transceiver 3A, accepts and processes the packet.

In an alternate signal path, illustrated by the dashed lines in FIG. 5, packet 118 is retrieved by transceiver 2B and retransmitted to its final destination, transceiver 3A. Such an embodiment is useful where a packet may need to be transferred further than line noise and attenuation would otherwise allow. In some embodiments, each of the transceivers has such a store-and-forward capability, and in other embodiments, only selected transceivers may store and forward packets. Of course, the packets can be easily encoded according to an error-correcting code, and error-detecting and correcting protocols can be used as is known to conventional packet communication systems.

The distance from a transceiver to a subscriber site is not limited in the present invention, although in many cases a transceiver will operate in conjunction with a power meter to record the amount of power used at the subscriber site or used to disable the flow of power to the site. Not all transceivers need be located near a subscriber site, however. For example, some transceivers might be used to collect data from power meter transceivers and to transmit the collected data via radio or other non-PLC communication means, to a central utility computer. Such a transceiver might be located high on a power pole to efficiently communicate using radio signals, or near telephone lines to easily couple to telephone lines.

The above description is illustrative and not restrictive. Many variations of the invention will become apparent to those of skill in the art upon review of this disclosure. Merely by way of example, a transceiver on a power distribution transformer can broadcast data to a plurality of transceivers on a plurality of other power distribution transformers; two-way communication can be broadcast from transceivers on different power distribution transformers; or communication can occur between sites separated by more than one level of distribution, in which case signals will travel up and down several levels of distribution transformers. The scope of the invention should, therefore, be determined not with reference to the above description, but instead should be determined with reference to the appended claims along with their full scope of equivalents.

What is claimed is:

1. A power line carrier communication system for communicating between a first subscriber site and a second subscriber site of a power distribution system which conveys power at an alternating current power line frequency, where the first subscriber site is coupled to a common primary distribution line through a first distribution transformer and the second subscriber is coupled to the common primary distribution line through a second distribution transformer, comprising:

a transmitter at the first subscriber site which outputs a signal at a transmitter output, said signal being referenced to an earth ground and being a modulated carrier signal characterized by a carrier frequency, said carrier frequency being different from the power line frequency;

first secondary distribution means coupled to a secondary side of the first distribution transformer and to a first power feeder at the first subscriber site for distributing power to said first power feeder;

second secondary distribution means coupled to a secondary side of the second distribution transformer and to a second power feeder at the second subscriber site for distributing power to said second power feeder;

a first plurality of coupling capacitors, wherein each of said coupling capacitors is coupled at a first terminal to said transmitter output and is coupled at a second terminal to a line of said first secondary distribution means; and a second plurality of coupling capacitors, wherein each of said coupling capacitors is coupled at a first lead to a line of said second secondary distribution means; and a receiver at the second subscriber site, commonly coupled at an input to a second lead of each one of said second plurality of coupling capacitors, said input receiving said signal from said transmitter as a voltage relative to said earth ground, said signal received after propagating through said first plurality of coupling capacitors, said first distribution transformer, the common primary distribution line, said second distribution transformer, and said second plurality of coupling capacitors.

2. The apparatus of claim 1, wherein said receiver and said transmitter are an element of separate transceivers, respectively, whereby communication between the first subscriber site and the second subscriber site is bi-directional communication.

3. The apparatus of claim 1, further comprising a plurality of receivers at a plurality of subscriber sites wherein each of said plurality of subscriber sites comprising a second secondary distribution means, wherein each of said plurality of subscriber sites receives electrical power from one of said second secondary distribution means of said plurality of subscriber sites and a plurality of similar distribution means.

4. The apparatus of claim 1, wherein said first secondary distribution means and said second secondary distribution means are three-phase distribution lines, respectively.

5. The apparatus of claim 1, wherein said first secondary distribution means and said second secondary distribution means are single phase distribution lines, respectively, and a center tap of a secondary winding of each of said first and second distribution transformers is connected to said earth ground.

6. A circuit for coupling a transmitter and a receiver through an electrical power distribution system, where power in the electrical power distribution system originates at a power station and is transmitted through high-voltage lines at a power line frequency to at least a first and a second distribution transformer, where at least one primary winding of the first distribution transformer is electrically coupled to the high-voltage lines and magnetically coupled to at least one secondary winding of the first distribution transformer which is electrically coupled to at least a first secondary distribution line, the first secondary distribution line for providing electrical power to at least a first electrical utility subscriber site, where at least one primary winding of the second distribution transformer is electrically coupled to the high-voltage lines and magnetically coupled to at least one secondary winding of the second distribution transformer which is electrically coupled to at least a second secondary distribution line, the second secondary distribution line for providing electrical power to at least a second electrical utility subscriber site, and where the first and second distribution transformers are optimized to transfer power at the power line frequency, comprising:

an output of the transmitter which imposes a common-mode signal relative to an earth ground onto a transmitter output wire, where said signal is a modulated carrier with a carrier frequency other than the power line frequency;

a first coupling capacitor coupled at a first terminal to said transmitter output wire and coupled at a second terminal to an end tap of one of the at least one secondary winding of the first distribution transformer; and a second coupling capacitor coupled at a first lead to a signal node and coupled at a second lead to an end tap of one of the at least one secondary winding of the second distribution transformer, wherein said signal node is coupled to an input of the receiver.

7. A method for communicating between a first subscriber site and a second subscriber site of a power distribution system, where a communication path crosses at least a first distribution transformer and a second distribution transformer which are both coupled to a common primary distribution line, comprising the steps of:

common-mode coupling a transmitter to at least two lines of a first secondary distribution line, said first secondary distribution line also coupling electrical power from the first distribution transformer to the first subscriber site;

common-mode coupling a receiver to at least two lines of a second secondary distribution line, said second secondary distribution line also coupling electrical power from the second distribution transformer to the second subscriber site;

generating a packet comprising data to be communicated and an address corresponding to said second subscriber site;

outputting a signal representative of said packet from said transmitter, said signal conveyed as a varying voltage relative to earth ground on both of said at least two lines of said first secondary distribution line, said signal being of equal phase and amplitude on each of said at least two lines of said first secondary distribution line;

receiving said signal at least at said receiver, said signal conveyed as a varying voltage relative to earth ground on both of said at least two lines of said second secondary distribution line, said signal being of equal phase and amplitude on each of said at least two lines of said second secondary distribution line;

converting said signal into a received packet, said address being readable in said received packet;

comparing said address to a receiver address; and accepting said received packet when said address and said receiver address match, and discarding said received packet when said address and said receiver address do not match.

8. The method of claim 7, further comprising the steps of:

designating at least one transceiver as a store-and-forward transceiver;

accepting said packet at said store-and-forward transceiver from said transmitter; and retransmitting said packet from said store-and-forward transceiver to said receiver.

* * * * *